UNITED STATES PATENT OFFICE.

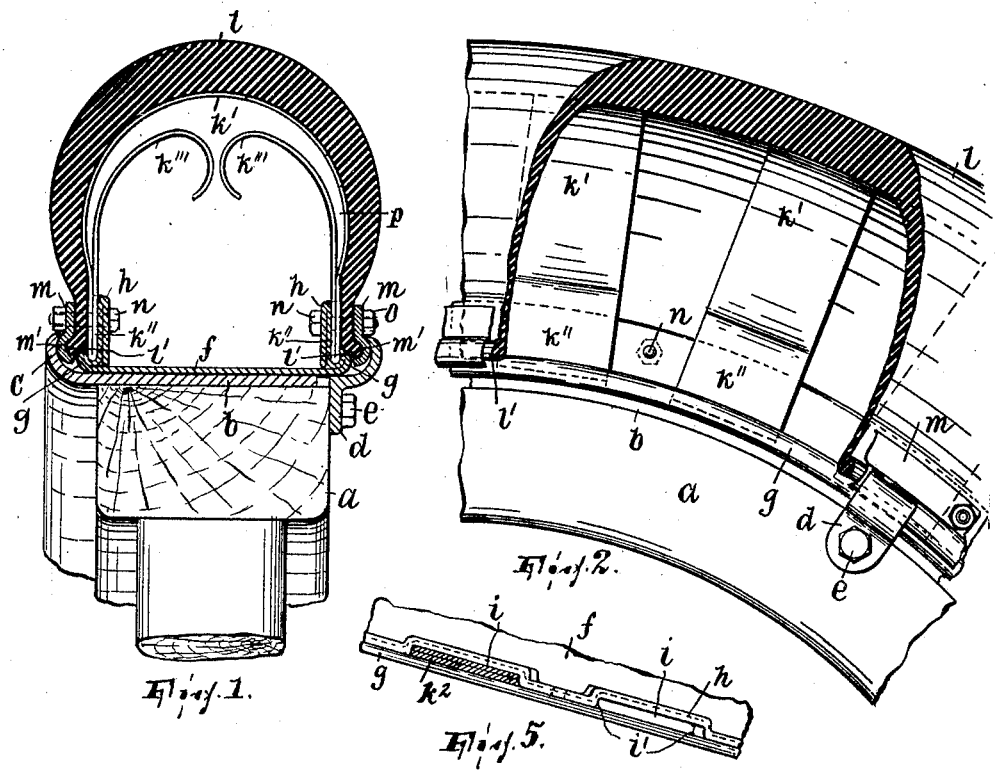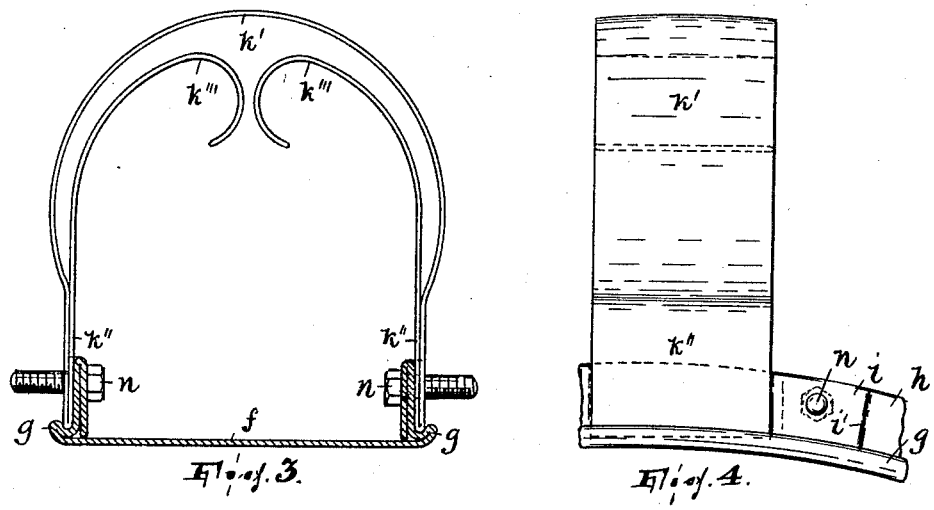

WILLIAM SMALL AND JOHN G. SMALL, OF PATERSON, NEW JERSEY.

VEHICLE-TIRE.

1,346,514.   Specification of Letters Patent.   Patented July 13, 1920.

Application filed December 12, 1919. Serial No. 344,289.

*To all whom it may concern:*

Be it known that we, WILLIAM SMALL and JOHN GRANT SMALL, citizens of the United States, residing at Paterson, in the county of Passaic and State of New Jersey, have invented certain new and useful Improvements in Vehicle-Tires, of which the following is a specification.

This invention relates to vehicle tires, and it has for its object to provide a tire of this class which will have all the advantages and none of the disadvantages of pneumatic tires, the same having a shoe of rubber which may be more or less the same as the rubber shoe used in ordinary pneumatic tires but instead of an inflatable inner tube a series of transverse arched spring members of a form at once novel and designed to meet the various requirements of an elastic hollow tire.

In the accompanying drawings fully illustrating the invention,

Figure 1 is a transverse sectional view of the tire-including portion of a wheel embodying the invention;

Fig. 2 is a side elevation, partly in section of said wheel;

Fig. 3 shows in transverse section, detached from the wheel, the means to support the rubber shoe interiorly;

Fig. 4 is a side elevation of said means; and

Fig. 5 is a fragmentary plan of the rim to which the aforesaid members are attached, one of which appears in section.

The wheel felly is indicated at $a$, and at $b$ is indicated a rim (herein termed the fixed rim) permanently fixed thereon in any way, the same having one edge turned outwardly to form a continuous shoulder $c$ with which coacts a series of clips $d$ (which are removably secured to the side of the felly opposite to shoulder $c$ by screws $e$) to hold in place the tire structure now to be described substantially in the same way that the ordinary demountable rim of a pneumatic tire is usually held in place.

The tire structure referred to includes a demountable rim member and the aforesaid springs and rubber shoe and preferably certain metallic rings secured to the rim.

The demountable rim is an annulus $f$ of metal having its edge portions folded outwardly and back to produce the rebends $g$, then bent outwardly and again folded back to produce the rebends $h$; thus the rim becomes an outwardly channeled member, the sides of its channel being the rebends $h$ which are in effect flanges in planes perpendicular to the axis of the wheel. Preferably by suitably bending the flanges at regular intervals recesses $i$, having their sides or side shoulders $i'$ in radii of the wheel, are formed in the outer faces thereof; and the rebends $g$ are flared outwardly.

The transverse arched springs are strips of metal of the same width as the recesses or seats $i$ and each has its intermediate portion $k'$ bent to substantially the form of somewhat more than one-half a circle and its end portions then first extending substantially parallel to each other and then folded inwardly and back on themselves to produce the rebends $k''$ and then, normally spaced from the portion $k'$ and from each other, terminating in curves $k'''$, presenting their convex faces to each other and arranged equidistant from a plane midway between and parallel with the planes of the rebends $k''$. The rebends $k''$ form the bases or attaching portions of the springs and are adapted to be set in the seats $i$ of the aforesaid rim (see Fig. 5) bearing at their ends against the bends $g$.

The rubber shoe $l$ is of the well-known type open at the inside and having outward beads $l'$ at its edges. With the springs all in place on the rim, when the shoe is assembled with these parts the springs at their outer surfaces snugly adhere to the inner surface of the shoe (Fig. 1).

The rings, $m$, are formed continuously channeled at their inner portions, so that at the inside of each there is a groove $m'$. They bear against the outer lateral faces of the shoe, their grooves $m'$ receiving the beads $l'$ of the same.

For holding the springs, shoe and rings to the rim in the relation stated there are provided bolts $n$ which penetrate the flanges of the rim (preferably between the springs— Fig. 2), the shoe and the rings and have nuts $o$. Upon tightening the nuts on the bolts the lateral portions of the shoe and the bases of the springs may be clamped securely between said rim flanges and the rings, the interlock between the springs and said flanges afforded by the seats $i$ keeping the springs from canting over one way or the other in the direction of the length of the wheel tread.

When the tire structure has been assembled it is slipped onto the fixed rim $b$ of the wheel felly and then the clips $d$ are secured in place by means of their screws $e$. The clips and the shoulder $c$ of the fixed rim bear against the rings $m$ and together act to clamp the tire structure to the wheel.

We are aware that springs for use in a hollow yielding vehicle shoe and formed so that the intermediate portion of each conforms to the transverse inner shape of the shoe and so that their ends are curves contacting or capable of contacting at their convex sides with each other are not new. But so far as we are aware it is new to fold the ends of the springs inwardly on themselves to produce rebend-bases and then shape their extremities as curves having their convex faces opposed to each other, which construction not only brings the curves into play to better advantage as a part of the resilient medium of the tire but makes them in themselves stronger and the springs capable of being held in position in a simpler, more secure and otherwise more advantageous manner. It will be understood, of course, that when the improved tire is rolling, under load, and the portion $k'$ of each spring is flattened sufficiently the pressure of the vehicle becomes resisted by the curves which then bear against and so coact with each other.

Under side thrust imposed on the wheel, as in taking a curve, the pressure is first resisted by the lateral portions of the parts $k'$ and then also by the two coacting curves, to wit, as soon as there has been a shifting of the shoe sufficient to close up the space $p$ at one side or the other according to the direction of such side-thrust.

Having thus fully described our invention, what we claim as new and desire to secure by Letters Patent is:—

1. In combination, with a fixed tire-supporting part of a wheel, arched spring members arranged at intervals around said part and having their end portions folded inwardly upon themselves and terminating in curves having their convex faces toward each other, the folds of said end portions being opposed to opposite surfaces of said part facing sidewise of the wheel, a hollow resilient tire shoe open continuously thereof at the inside and fitted over said springs, and means to secure the springs and shoe to said part.

2. In combination, with a fixed tire-supporting part of a wheel, arched spring members arranged at intervals around said part and having their end portions folded inwardly upon themselves and terminating in curves having their convex faces toward each other, the folds of said end portions being opposed to opposite surfaces of said part facing sidewise of the wheel, a hollow resilient tire shoe open continuously thereof at the inside and fitted over said springs and having its edge portions flanking the folds thereof, and means to clamp said spring-folds and the shoe edge-portions to said part.

In testimony whereof we affix our signatures.

WILLIAM SMALL.
JOHN G. SMALL.